US010439866B2

(12) United States Patent
Crowns et al.

(10) Patent No.: US 10,439,866 B2
(45) Date of Patent: Oct. 8, 2019

(54) NETWORK EVENT LOCUS DESCRIPTOR

(71) Applicant: AVAGO TECHNOLOGIES INTERNATIONAL SALES PTE. LIMITED, Singapore (SG)

(72) Inventors: Scott Crowns, Campbell, CA (US); Nikunj Vaidya, Milpitas, CA (US)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 0 days.

(21) Appl. No.: 15/605,181

(22) Filed: May 25, 2017

(65) Prior Publication Data

US 2017/0366391 A1    Dec. 21, 2017

Related U.S. Application Data

(60) Provisional application No. 62/351,215, filed on Jun. 16, 2016.

(51) Int. Cl.
*H04L 12/24*        (2006.01)

(52) U.S. Cl.
CPC .......... *H04L 41/0677* (2013.01); *H04L 41/12* (2013.01); *H04L 41/145* (2013.01)

(58) Field of Classification Search
CPC .... H04L 41/0677; H04L 41/12; H04L 41/145
See application file for complete search history.

(56) References Cited

U.S. PATENT DOCUMENTS 7,668,953 B1 *    2/2010    Sinclair ................. H04L 41/064
                                                            709/224
2017/0126496 A1 *    5/2017    Sikand ................ H04L 41/0813

* cited by examiner

*Primary Examiner* — Ayaz R Sheikh
*Assistant Examiner* — Debebe A Asefa
(74) *Attorney, Agent, or Firm* — Xsensus LLP

(57) ABSTRACT

That each switch is configured with a series of new commands, such as NELD, which include various parameters, the parameters matching predefined terms, such as STP, BGP or DROP, and specifying a particular port or interface, if relevant. By predefining the parameters, the switch is configured to obtain data relevant to a particular problem. When a problem occurs, the administrator sends the command to all relevant switches with a parameter relevant to the problem being analyzed. Preferably, this sending of the command is done using a management application, so that the command can be sent to each switch by the management application in an extremely short period. By capturing all of the data in a small window, the odds are greatly improved on obtaining the relevant data. By having the preprogrammed commands, all of the desired data can be obtained in a single command rather than a series of commands.

20 Claims, 6 Drawing Sheets

NETWORK EVENT LOCUS DESCRIPTOR

CROSS REFERENCE TO RELATED APPLICATIONS

This application claims the benefit under 35 U.S.C. .sctn.119(e) of U.S. Provisional Patent Application Ser. No. 62/351,215, entitled "Network Event Locus Descriptor," filed Jun. 16, 2016, which is hereby incorporated by reference.

BACKGROUND

Technical support engineers and engineering groups often require detailed computer network topology information to understand, triage and resolve technical support issues. In some cases, topology diagrams already exist, but are not focused on relevant devices or relevant subsystems in these devices that are critical to understanding the technical issue. These diagrams may also lack crucial detail and the type of detail required can vary, depending on the technical support issues reported. Creating detailed, pinpoint topology diagrams is time consuming and requires lengthy back and forth discussions between customers and technical support. If accurate topologies are not created when a trouble ticket is first raised, with tech support, valuable time is lost in resolving technical issues and relevant data may be lost, as well.

Even when the topology is known, obtaining timely information from the relevant elements is also very difficult. Numerous CLI (command line interface) commands must be provided to relevant device. Remembering that many events are highly transitory, the many manual CLI commands decreases the ability to have the proper information available to perform any analysis, thus providing a further obstacle to analysis of a problem.

BRIEF DESCRIPTION OF THE DRAWINGS

The present invention has other advantages and features which will be more readily apparent from the following detailed description of the invention and the appended claims, when taken in conjunction with the accompanying drawings, in which:

DETAILED DESCRIPTION OF THE PREFERRED EMBODIMENTS

Figure 1:
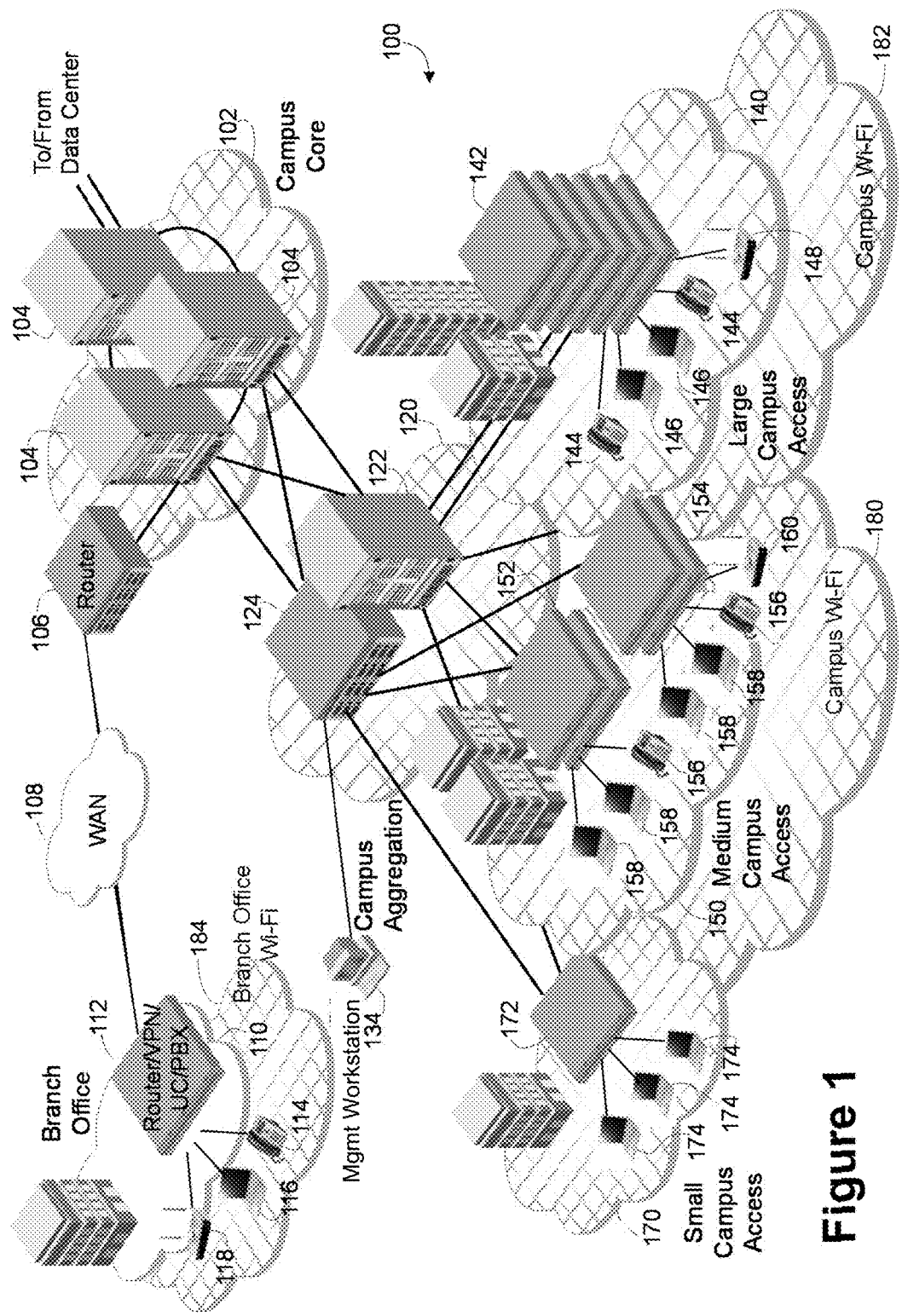
FIG. 1 is a block diagram of an enterprise network architecture.

FIG. 1 illustrates a general network architecture 100 for an enterprise with branch offices and various campuses. A campus core network 102 includes a plurality of interconnected core switches 104. The core switches 104 are connected to a data center (not shown). A router 106 is connected to the core switches 104. The router 106 connects through a wide area network (WAN) 108 to a branch office network 110. The branch office network 110 includes a unified device 112, which operates as a router, virtual private network interface, unified communication interface, switch and PBX. Therefore, telephones 114, computers 116 and wireless access points 118, with associated branch office Wi-Fi® area 184, are connected to the unified device 112. A campus aggregation network 120 is connected to the campus core network 102. The campus aggregation network 120 includes switches 122 and 124. The switches 122 and 124 are connected to the core network switches 104. Connected to the switch 124 in FIG. 1 is a management workstation device 134 used by a network administrator to manage the network 100. A large campus access network 140 includes a series of stackable switches 142, which are connected to the switches 122 and 124. Connected to the stackable switches 142 are telephones 144, computers 146 and wireless access points 148, with associated campus Wi-Fi® area 182. A medium campus access network 150 includes a series of switches 152 and 154, which are connected to the switches 122 and 124. Connected to the switches 152 and 154 are telephones 156, computers 158 and wireless access points 160, with associated campus Wi-Fi® area 180. A small campus access network 170 includes a switch 172, which is connected to the switches 122 and 124.

Figure 2:
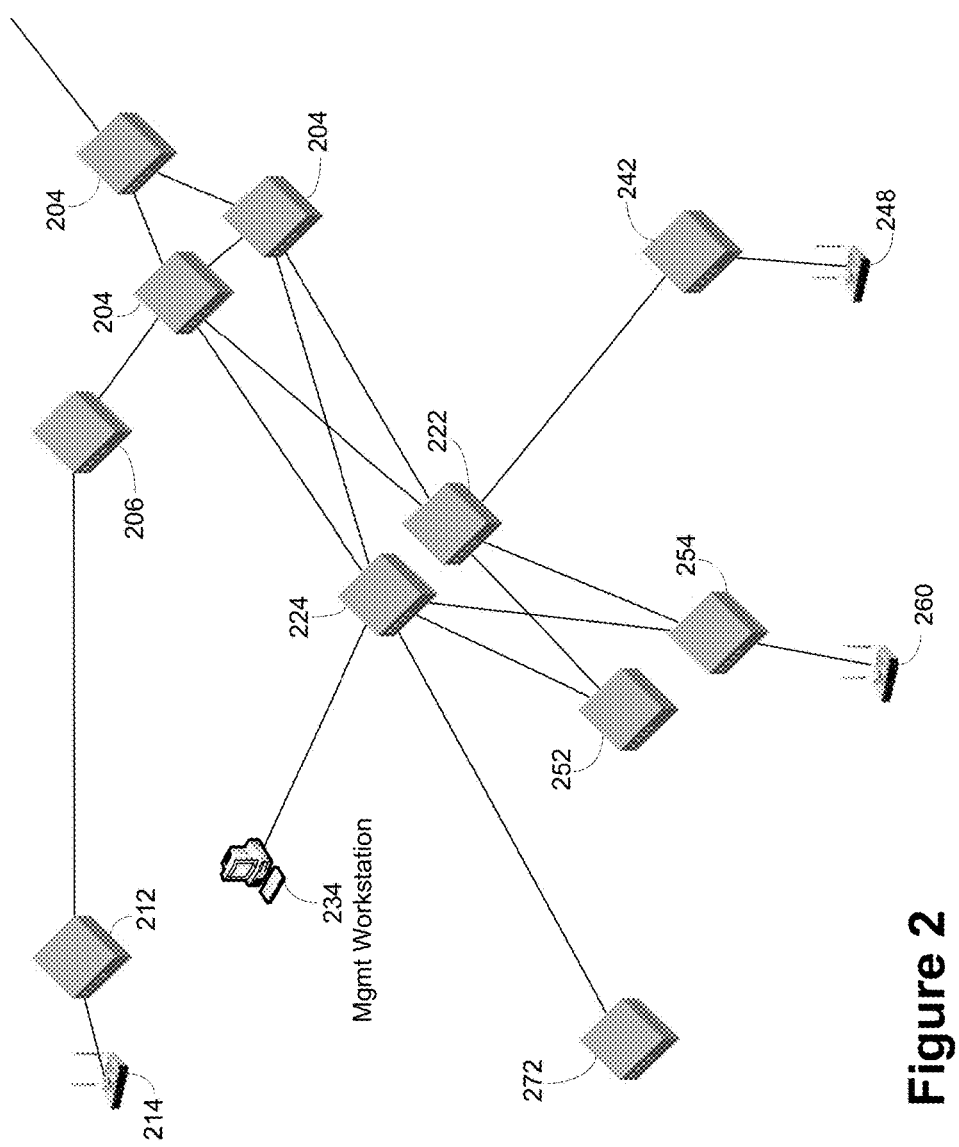
FIG. 2 is a topology view of the network of FIG. 1.

FIG. 2 is a topology view of the network 100, with the leading digit changed to a 2 and omitting the various connected devices other than the wireless access points but including the management workstation 234. This is representative of a typical topology view that would be shown by network management software executing on the management workstation 234. In practice, the topology views would be much more complex and often segmented or grouped for intelligibility.

Figure 3:
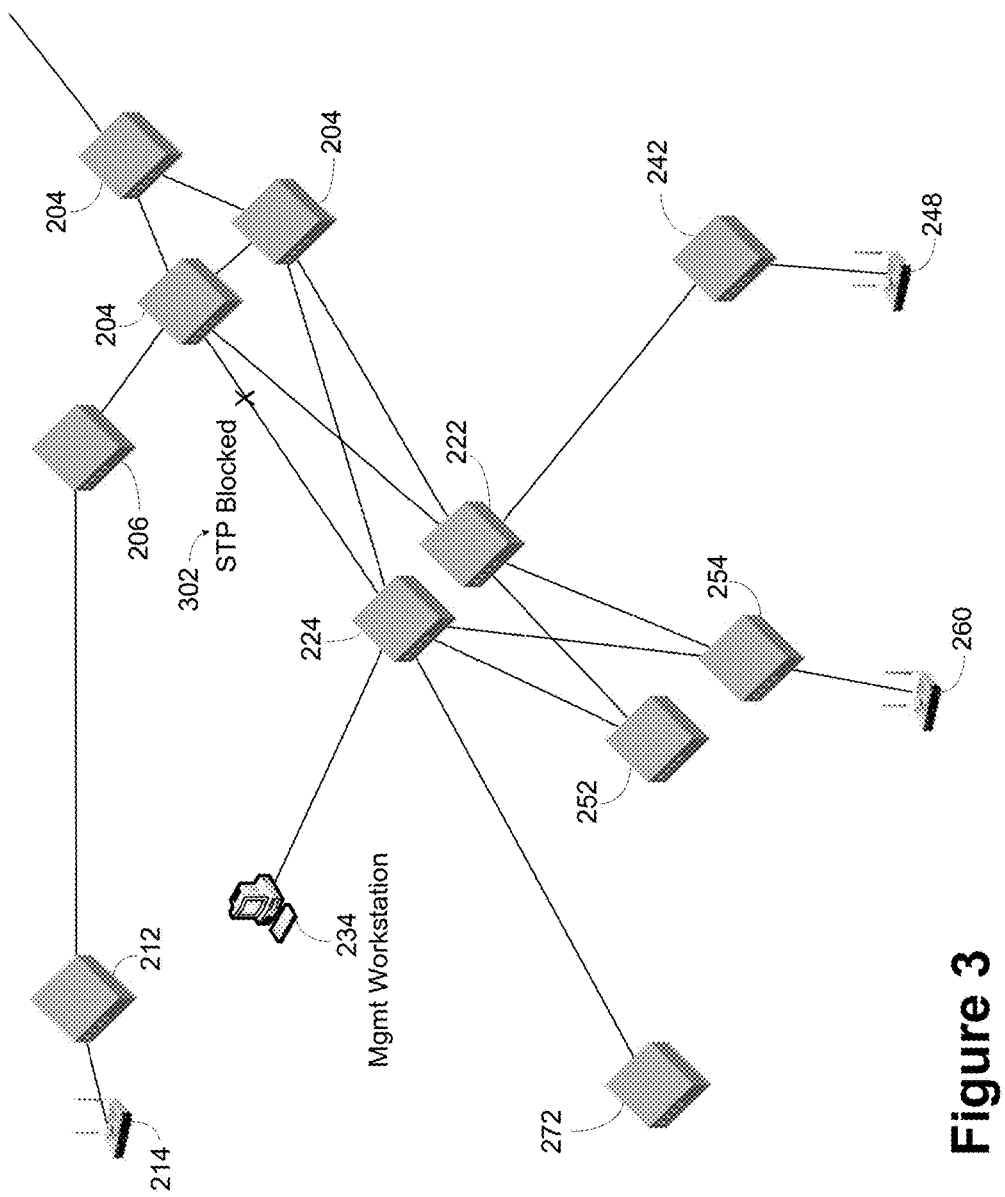
FIG. 3 is the topology view of FIG. 2 with a fault indicated.

FIG. 3 is the topology view of FIG. 2, except that a problem is illustrated on the topology view for reference. The illustrated problem is that STP (spanning tree protocol) routing is blocked 302 on the link from core switch 204 to aggregation switch 224. This problem is hurting network 100 performance and operation and needs to be diagnosed and corrected promptly. As discussed above, numerous CLI commands must be provided to relevant devices, such as switches 204, 222 and 224, and router 206. The network administrator must log into each of the switches, access the CLI and then issue the various commands needed to gather data from that switch to diagnose the problem. In the example below, seven different commands are needed to obtain the necessary information. So even in this simple example, the administrator would have to enter 42 commands. It is apparent that this is very tedious and may hinder analysis as conditions may have changed in the switches during the command process.

In a complete system according to the present invention, the data gathering necessary to determine the network topology and gather relevant information in a timely fashion is highly automated. The output of the data gathering is preferably provided in a YANG model to allow much improved data and condition analysis.

As a pre-cursor to operation at the time of a network problem, each switch is configured with a series of new commands to be exercised from the CLI or through an API. The command, such as NELD, includes various parameters, the parameters matching predefined terms, such as STP, BGP or DROP, and specifying a particular port or interface, if relevant. For different problems, different data is relevant. To trace an STP error requires different information than a port having a high error rate. Further, certain problems need switch-level information, while other problems need port level information and other problems need both levels. By predefining the parameters, the switch is configured to obtain data relevant to the particular problem. This data can include particular port information but can also include switch topology information, so that the network topology can be determined at the time of the command, not be based on some potentially out-of-date information.

When a problem occurs, the administrator sends the command to all relevant switches with a parameter relevant to the problem being analyzed. Preferably, this sending of the command is done using a management application, so that the administrator need only identify the relevant switches and the desired parameters and the command can be sent to each switch by the management application in an extremely short period. An alternative to specifying switches is to send the command as a broadcast frame with a limited number of hops, the command emanating from the switch of interest. As the broadcast frames will propagate very quickly, again the data is captured over a very small time window. By capturing all of the data in a small window, the odds are greatly improved on obtaining the relevant data. Further, by having the preprogrammed commands, all of the desired data can be obtained in a single command rather than a series of commands. Again, this decreases the time window of the data capture.

Once the data has been obtained by the switches, the management application can use an API (application programming interface), preferably using REST (Representational state transfer) commands, to obtain the data from the switches. The data is then converted into a YANG (Yet Another Next Generation) model of the network. The YANG model will be centered on the switch of interest and contain the relevant data to allow modeling and analysis. Once the YANG model is obtained, a number of alternatives are available for the administrator and tech support engineers. First, the YANG model can be converted into a network topology drawing by a plotting program and can replace or update any existing topologies maintained by the company. Second, the configuration can be reproduced, i.e. actually built, either physically or virtually, in a diagnosis lab to aid in replicating the problems. Third, the data can be provided to various analytics engines to compare to desired configurations and the like. Any and all of these options improve the troubleshooting capabilities.

In addition to the NELD command, CLI config commands can be executed to obtain topology-related information, simplifying the NELD commands. The CLI config information can include information on ports, MAC (media access control) address, IP (Internet protocol) addresses, BGP (border gateway protocol) peers, STP root bridge, etc. Additionally, for IP routing issues, a traceroute command can be issued to a destination showing problems. All of these commands can be coordinated through the network management system.

As discussed above, specific locations in the topology are configured to provide data using the NELD command. Examples include core facing interfaces of devices and certain host interfaces can be selected and pre-configured to be included in this "topology-extract". Thus when the issue occurs on say another interface, the command can be added under that interface and the "topology-extract" would show the new interface relative to the current topology.

NELD configuration across the two ends of the links enables the topology-extract to be recorded with matching id's for the same link. This enables the plotter to interpret it as a link or in the same segment and draw the devices accordingly, without the need for depending upon LLDP (Link Layer Discovery Protocol) protocol. Unlike LLDP that provides information about only physical links, this can be configured under virtual interfaces (like VE (virtual Ethernet), PO (port channel), tunnels).

Levels can be provided in the configuration. i.e. all physical interfaces can be given a "level-1" whereas virtual interfaces "level-2". Thus provides granularity to the plotter to build out required level of topology, depending upon customer needs.

As an alternative embodiment to exporting the YANG model, a standard way of exporting the "topology-extract" using special REST tags that enables devices for a standard way to interpret and build a diagram can be used.

The configuration also adds details that are required to be cached/collected. i.e. For an interface, it will need interface MAC addresses learned on the interface, VLAN (virtual local area network) id, state, etc. . . . . .

The standard way of exporting the topology allows to import it in standard way, not only for the plotters, but REST based controllers, that can provision those topologies instantly. Thus for the Support function, the reproduction labs are instantly built based upon the "topology-extract".

A computer network may be abstracted on multiple levels, such as a VLAN or spanning tree instance, an MPLS (Multiprotocol Label Switching) VRF (virtual routing and forwarding) instance, layer 3 only views for a protocol such as OSPF (Open Shortest Path First) or BGP, a specific path, at layer 2 or layer 3 between particular devices or many other dimensions. These multiple views or dimensions exist in the network at all times and are constantly changing, based on configuration changes, device events (adding devices, bringing up/down interfaces, link failure, etc.) and state (databases, forwarding tables, etc.). At a given moment in time, which could be associated to a network event, such as a spanning tree loop or packet loss, the portion of the network/devices relevant to that event (selected generically ahead of time) can be abstracted and exported. This abstraction would contain selected topology elements, specific configuration for each device identified and relevant state, associated with the issue. Each event has a locus, such as a data path or VLAN or VRF and the elements of the specific abstraction (topology, state and configuration) can be associated with a Descriptor developed ahead of time for this event. This descriptor is reflected in a NELD command.

NELD specific topology element, configuration and state groupings can be developed for common troubleshooting scenarios encountered by the TAC (technical assistance center), customers or partners. The relevant network devices are abstracted, using a protocol, such as YANG, along lines specific to the type of NELD under consideration. For example, a NELD specific feature for a product such as VDX, when communicated to the device via CLI or script, parses specific interface information, config information and state and sends it from the device using NETCONF (Network Configuration Protocol). On a server, plotter, SDN (software defined network) controller or analytics engine, the NELD specific abstraction of the portion of the network associated with the event is stored, manipulated and analyzed.

Each abstraction of this aspect of the network, once translated into YANG and exported via NETCONF, is now a freestanding NELD object associated with that event at that moment in time. This abstraction can then be used with a plotter to develop topologies for troubleshooting or design modifications, can be used with NFV (network function virtualization) to virtualize this slice of the customer network and create a mirror image on VMs (virtual machines) or all the relevant devices and state, can be transposed on to a multiplexed lab environment or fed to an analytics engine for fault isolation and base line measurements.

Therefore, embodiments according to the present invention provide the capability to capture and export a specific abstraction of a dimension of a computer network (including topology elements, configuration elements and relevant state), at a given moment in time, and keyed to common network problems or events, by a specific NELD.

NELD abstractions of network devices/events could also be consumed by analytics engines for machine learning regarding fault isolation, network design recommendations, contingency planning, as well as monetized to end customers paying for services, data or utilization.

Event driven automation, such as StackStorm®, can be used, to identify key indicators of common network problems or events and then capture specific NELD associated to those indicators. Having a portion of the network, relevant to an event or protocol, represented by NELD abstractions of all relevant devices, allows faster fault isolation and remediation due to the reduction in the amount of data to be reviewed by humans or analytics engines, to determine root cause. For example, a NELD data structure, specific to OSPF, is populated with OSPF relevant config, state and topology elements for a given device, the NELD abstraction of this device can then be added with those of other devices to form an abstraction of the OSPF relevant portion of the network (only). Troubleshooting and resolving OSPF issues is now simplified and facilitated as all the extraneous information from each device has been removed from the analysis of this issue. Additionally, vendor specific or hardware specific details have also now been hidden in the abstraction. This would allow humans or analytics engines to troubleshoot the OSPF issue without having to know the specific CLI, architecture and other proprietary elements of each device. This is similar to device abstraction in OpenStack®, for the purposes of provisioning and building infrastructure as a service. SDN controllers could then use NELD and NETCONF/REST to communicate with the original device (s), without requiring specific CLI commands or other vendor specific/proprietary information, to resolve the OSPF issue.

Another use for the NELD abstractions of each device would be to replace suspect devices by a virtualized representation of that device, in one dimension, created using NELD and NFV. For example, if an OSPF issue involved six routers, the router suspected as being the locus of the issue could be replaced by a VM running the NELD representation of that router's OSPF and topology elements. In this way, a "shunt" could be created to route traffic or other functions around suspect devices by emulating the specific NELD representation of them created with NFV and allowing the rest of the network to communicate with the NFV abstraction of the device, rather than the suspect device itself.

Figure 4:
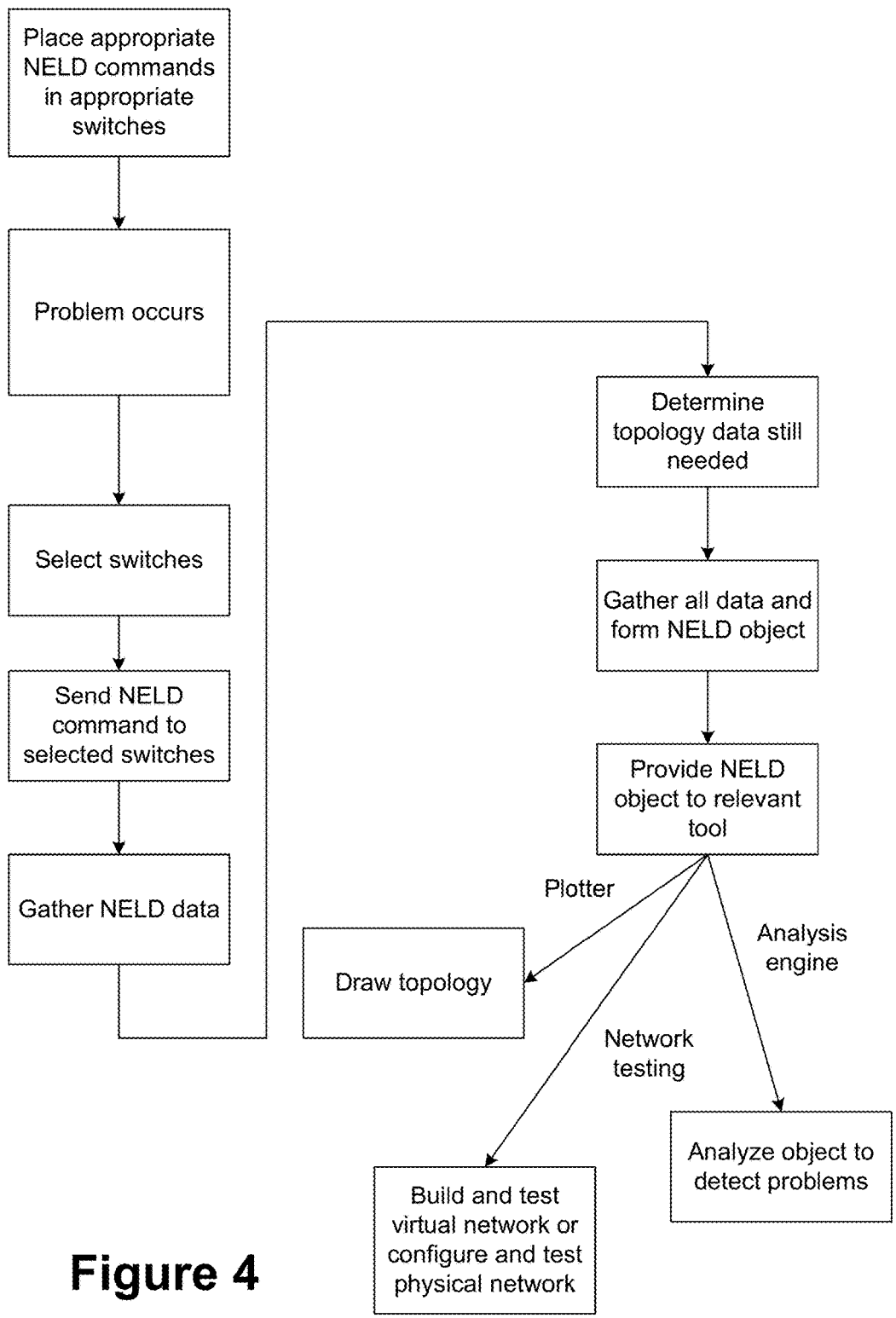
FIG. 4 is a flowchart of operations according to the present invention.

NELD operations according to the present invention are shown in the flowchart of FIG. 4. In step 402, the appropriate NELD commands are installed in the appropriate switches. Examples are commands such as STP, BGP and DROP, to cover STP, BGP and dropped frame problems, respectively. Installing the command includes both providing the command word but also the various CLI commands to be performed. An exemplary NELD STP command is illustrated in Table 1.

TABLE 1

NELD STP [vlan <vlan-id> | port-channel <po-num>]
[append flash: //<filename>]

| CLI commands | Explanation<br>Show Configuration commands: |
|---|---|
| show running-config protocol spanning-tree | Command shows configured state of STP, whether is STP is turned ON/OFF on a particular switch<br>Command also shows the flavor of STP enabled (STP, RSTP, MSTP)<br>Show spanning-tree states: |
| show spanning-tree brief | This command shows all vlans and their corresponding interfaces on which STP is enabled<br>shows STP port roles and states<br>Also shows information on Root bridge |
| show spanning-tree vlan <vlan-id> | This command shows STP details per vlan which includes:<br>STP Timers, topology changes, root bridge details, BPDU Guard details |
| show spanning-tree interface port-channel <po-num> | Displays interface specific information which includes:<br>interface STP state, role, ifindex, path cost, port-id, priority,<br>also shows received and sent BPDUs on the interface and STP link-type<br>Debug Spanning-tree: |
| debug spanning-tree event<br>debug spanning-tree bpdu<br>debug spanning-tree all | |

This NELD command then causes all STP information of the switch to be stored at the file <filename> and debug mode started for various STP aspects to record further STP events. The illustrated commands are based on commands used by Brocade Communications Systems, Inc., as described and illustrated in the Brocade Network OS Command Reference, 7.1.0. Each switch vendor has similar commands that can provide similar results.

In step 404, a problem occurs in the network 100, such as an STP blockage 302. After the problem has been recognized, the administrator determines the relevant switched for the diagnosis in step 406. This process is described above. In step 408, the administrator sends the proper NELD command to the selected switches, such as the NELD STP command shown above. This causes the specified CLI commands to be executed at a very high rate, much faster than could be done by an administrator and even faster than if a management program resident on the management workstation performed the same CLI commands. This allows the most contemporaneous capture of the requested information, to greatly reduce the possibility of any configuration commands being executed to change the switch, which would hinder diagnosis efforts.

If an option is chosen to not direct the output to a file, the output of the NELD command is returned to the management workstation 234 and then captured and stored. If the option is chosen to direct the output to a file in the switch firmware, then in step 410 the NELD data is gathered from the various switches.

In step 420, any needed topology information is gathered, as discussed above. In step 422, the NELD data is collected and formed into an NELD object. In step 424, the NELD object is provided to the relevant tool. If the tool is a plotter, in step 426 the NELD object is provided to a plotter, which develops the topology and provides an appropriate output. If the tool is for network testing, in step 428 the NELD object is provided to a test environment. In one embodiment, the test environment builds a virtual network based on the NELD object and then tests the virtual network. In another embodiment, if the network is a physical network, a test physical network is configured according to the NELD object to replicate the portion of the network too and the network is tested. If the toll is an analysis engine, in step 430 the NELD object is provided to the analysis engine and the NELD object is analyze to detect the source of the problem, such as the STP problem.

Figure 5:
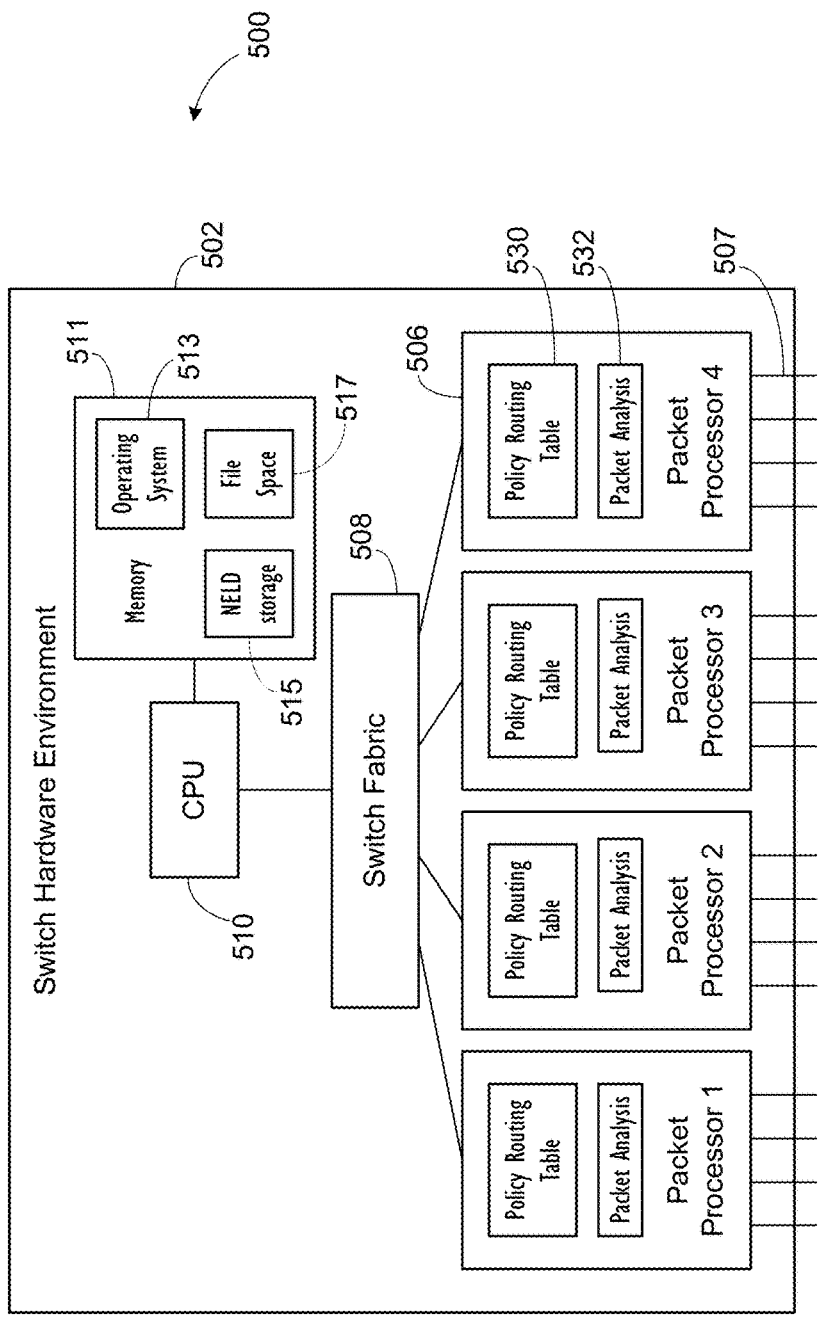
FIG. 5 illustrates an exemplary switch according to the present invention.

FIG. 5 illustrates an exemplary switch 500 according to the present invention. The switch hardware 502 includes a series of packet processors 506 that provide the switch ports 507. Each packet processor 506 includes a policy routing table 530 for routing packets and a packet analysis module 532, which analyzes packet headers and the like for desired information. The packet processors 506 are connected to a switch fabric 508 to allow packet switching. A switch CPU 510 is connected to the switch fabric 508 to allow packets to be forwarded from the packet processors 506 to the switch CPU 510 for further analysis and handling. A memory 511 is connected to the CPU 510 and holds program instructions executed by the CPU 510 to perform the various operations. Those program instructions include an operating system 513. The operating system 513 manages the switch 500 operations and includes the management interface, preferably both CLI and API, used by the switch 500 to receive management commands. In the preferred embodiments, these management commands include NELD commands and the various individual CLI commands for each NELD command, as discussed above. The specific NELD commands and their related CLI commands are stored in NELD storage 515. File space 517 is present to provide space for NELD commands to write their output, if desired. In the preferred embodiments, the packet processors 506 detect the received management command packets and forward them through the switch fabric 508 to the CPU 510. The CPU 510 determines that a NELD command has been provided, retrieves the associated individual CLI commands and executes them, storing the results for retrieval or providing the results, depending on the selected choice. This is an exemplary switch architecture and many variations and further details are well known to those skilled in the art. Given the above description, one skilled in the art can modify those variations to provide similar functionality to that described herein.

Figure 6:
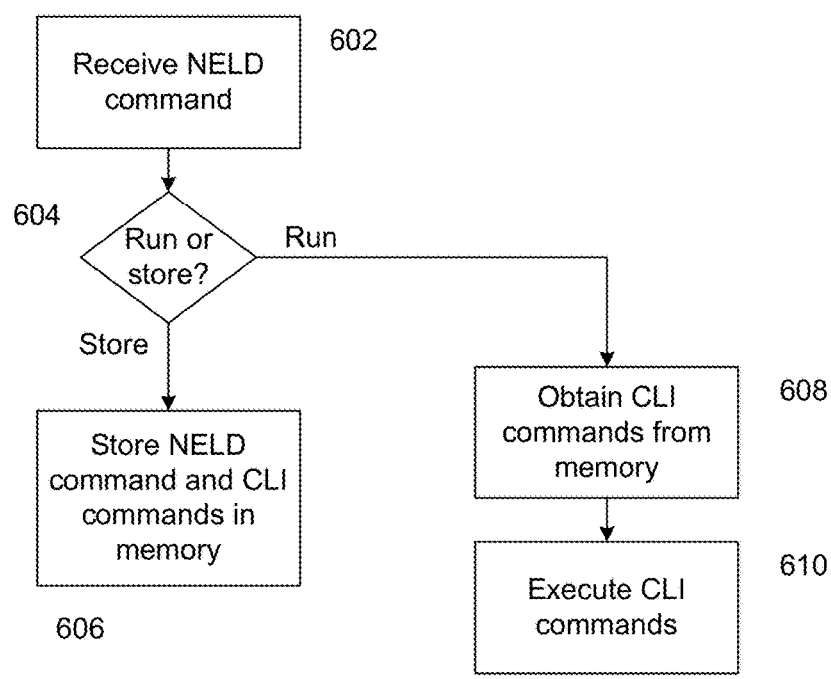
FIG. 6 is a flowchart of switch operations according to the present invention.

FIG. 6 illustrates the operation of the switch 500 for NELD commands. In step 602, the switch 500 receives a NELD command. In step 604, the switch 500 determines if the NELD command is to be run is or for storing a new NELD command and CLI commands. If the NELD command is to be stored, in step 606 the NELD command and the CLI commands are stored in the memory 511. If the NELD command is to be run, in step 608 the CLI commands are retrieved form memory 511. In step 610, the CLI commands are executed in the order stored. If the particular command specifies writing to the flash in the switch, that location is used. Otherwise, the output is returned to the device providing the NELD command.

The above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A method, comprising:
configuring a plurality of network devices with a data collection command with a network event locus descriptor (NELD) command, the NELD command specifying an event of a network formed at least in part by the plurality of network devices, and the data collection command having a plurality of pre-configured switch commands to be executed in the collection of data for the NELD command;
transmitting, after occurrence of the event from a network management device, a responsive data collection command to each of a relevant subset of the plurality of network devices, the responsive data collection command including the NELD command;
receiving, from each of the subset of the plurality of network devices, data of the plurality of pre-configured switch commands of the command in response to the responsive data collection command;
combining the data to produce an analysis data set for the network event;
forming, using the analysis data set, a NELD object; and
drawing a topology of the network by utilizing the NELD object.

2. The method of claim 1, further comprising forming a YANG model of the network from the analysis data set.

3. The method of claim 2, further comprising developing the topology of the network from the YANG model.

4. The method of claim 2, further comprising:
transmitting a configuration command to each of the subset of the network devices, the configuration command requesting topology-related data from each network device, and the configuration commands being transmitted in association with the data collection commands; and
receiving, from each of the subset of the plurality of network devices, the configuration information responsive to the configuration command, wherein
data items for a data collection command do not provide sufficient topology-related data to develop a complete topology.

5. The method of claim 4, further comprising developing the topology of the network from the received configuration information.

6. The method of claim 2, further comprising configuring the network to conform to the YANG model.

7. The method of claim 6, wherein the network is a physical network.

8. The method of claim 2, further comprising developing a virtual network to conform to the YANG model.

9. The method of claim 2, wherein the YANG model is analyzed by analytics software.

10. The method of claim 1, wherein the data includes data items that relate to a physical element of at least a network device of the subset of the plurality of network devices.

11. The method of claim 1, wherein the data includes data items that are on a virtual element representing at least a network device of the subset of the plurality of network devices.

12. The method of claim 1, wherein the relevant subset of the plurality of network devices is determined by selection of a user.

13. The method of claim 1, wherein the relevant subset of the plurality of network devices is within a number of hops from a given network device.

14. The method of claim 1, further comprising utilizing the topology to troubleshoot the network.

15. The method of claim 1, further comprising:
detecting a problem within the network; and
selecting the subset of the plurality of network devices based on the problem within the network.

16. The method of claim 15, further comprising utilizing the topology to troubleshoot the problem within the network.

17. A diagnostic device, comprising:
a processor; and
a memory coupled to said processor for storing programs executed by said processor, wherein
the processor is configured to:
configure a plurality of network devices with a data collection command with a network event locus descriptor (NELD) command, the NELD command specifying an event of the network, and the data collection command including a plurality of pre-configured switch commands to be executed in the collection of data for the NELD command,
transmit, after occurrence of the event from a network management device, a responsive data collection command to each of a relevant subset of the plurality of network devices, the responsive data collection command including the NELD command,
receive, from each of the subset of the plurality of network devices, data of the plurality of pre-configured switch commands of the command in response to the responsive data collection command,
combine the data to produce an analysis data set for the network event,
form, using the analysis data set, a NELD object, and
draw a topology of the network by utilizing the NELD object.

18. The diagnostic device of claim 17, wherein the processor is further configured to utilize the topology to troubleshoot the network.

19. The diagnostic device of claim 17, wherein the processor is further configured to:
detect a problem within the network; and
select the subset of the plurality of network devices based on the problem within the network.

20. The diagnostic device of claim 19, wherein the processor is further configured to utilize the topology to troubleshoot the problem within the network.

* * * * *